(12) United States Patent
Fannon et al.

(10) Patent No.: US 7,784,852 B2
(45) Date of Patent: Aug. 31, 2010

(54) ADAPTIVE SEALING DEVICE FOR VEHICLE DOOR

(75) Inventors: Joseph P. Fannon, Washington, MI (US); Richard K. Mette, Shelby Township, MI (US); Khristopher S. Lee, Oakland Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 213 days.

(21) Appl. No.: 12/145,654

(22) Filed: Jun. 25, 2008

(65) Prior Publication Data

US 2009/0322119 A1    Dec. 31, 2009

(51) Int. Cl.
*B60J 10/08* (2006.01)
(52) U.S. Cl. .................... 296/146.9; 49/475.1
(58) Field of Classification Search .............. 296/146.9, 296/146.11; 70/DIG. 56; 292/1, 340, 341.11, 292/341.12, 216, 337, 346, DIG. 2, DIG. 51, 292/DIG. 53; 400/271, 325; 49/475.1, 483.1, 49/493.1
See application file for complete search history.

(56) References Cited

U.S. PATENT DOCUMENTS

| 5,263,752 | A | * | 11/1993 | Phail-Fausey et al. | ....... 292/340 |
| 6,073,980 | A | * | 6/2000 | Arabia et al. | ............... 292/340 |
| 6,079,757 | A | * | 6/2000 | Aubry | ........................ 292/201 |
| 6,422,619 | B1 | * | 7/2002 | Arabia et al. | ............... 292/337 |
| 6,733,052 | B2 | * | 5/2004 | Perkins et al. | .............. 292/201 |
| 6,789,825 | B2 | * | 9/2004 | Kalargeros et al. | .......... 292/216 |
| 7,097,219 | B2 | * | 8/2006 | Paskonis | ..................... 292/340 |
| 7,188,872 | B2 | * | 3/2007 | Kalargeros et al. | .......... 292/216 |

* cited by examiner

*Primary Examiner*—Lori L Lyjak
(74) *Attorney, Agent, or Firm*—Quinn Law Group, PLLC

(57) ABSTRACT

A sealing device is provided for a vehicle having a door movable between a closed and an opened position. The door defines a fishmouth aperture. A striker pin is configured to enter the fishmouth aperture when the door closes and exit the fishmouth aperture when the door opens. The sealing device is configured to at least partially seal the fishmouth aperture while allowing the striker pin to enter and exit the fishmouth aperture.

13 Claims, 3 Drawing Sheets

ADAPTIVE SEALING DEVICE FOR VEHICLE DOOR

TECHNICAL FIELD

The invention relates in general to a vehicle having a door, with an opening in the door. More particularly, it relates to a sealing device for the opening in the door.

BACKGROUND OF THE INVENTION

Most vehicles today utilize a conventional door latch with an opening in the door to allow a striker to move in and out of the latch every time the door is opened and closed. The opening in the door may permit air, water, dust, and debris to pass into and out of the door cavity.

SUMMARY OF THE INVENTION

A sealing device is provided for a vehicle having a door movable between a closed and an opened position. The door defines an opening or "fishmouth aperture" disposed in a direction to receive a striker pin. The "fishmouth aperture" is an opening in the door that generally provides access to a latch mechanism for the striker pin. The striker pin is configured to enter the fishmouth aperture when the door closes and exit the fishmouth aperture when the door opens. The sealing device is configured to at least partially seal the fishmouth aperture while allowing the striker pin to enter and exit the fishmouth aperture. Three embodiments of the sealing device are described.

The striker pin may be operatively connected to a frame of the vehicle. The door may include a latch that engages with the striker pin when the door closes, the latch disengaging with the striker pin when the door opens.

The sealing device may include an integrated bracket operatively connected to the striker pin and a compressible sleeve engaged with the integrated bracket. The sleeve is configured to compress when force is applied. The sleeve has a sealing side that contacts a perimeter of the fishmouth aperture to create a surface seal when the door is closed.

The sleeve may have a generally cylindrical hollow shape with a generally circular first and second opening in the absence of the applied force. The sleeve is formed from a sufficiently resilient material that allows the sleeve to return to the generally cylindrical hollow shape when the applied force is removed. The sleeve may be made of rubber.

The integrated bracket may include a base and a generally straight first section. The sleeve may have an outer side and may be fitted onto the first section of the integrated bracket through respective slots formed on the sealing side and the outer side of the sleeve. The first section of the integrated bracket may have an extremity slightly larger than the respective slots on the sleeve, to prevent the sleeve from slipping off the integrated bracket. A first and a second end of the striker pin may connect to respective first and second holes on the base of the integrated bracket.

The sealing device may include a first and second portion attached to a perimeter of the fishmouth aperture that are configured to at least partially seal the fishmouth aperture when the door is open and when the door is closed.

A first slit may be made between the first and the second portions of the sealing device. A second slit oriented approximately perpendicularly to the first slit may also be made. The first and second slits may be configured to allow the striker pin to enter the fishmouth aperture such that the sealing device seals around the outer surfaces of the striker pin. The sealing device may be made of rubber or other flexible material.

The first portion of the sealing device may include a first set of bristles attached to a first bristle holder and the second portion of the sealing device may include a second set of bristles attached to a second bristle holder. The first and the second set of bristles may be composed of fiber, or alternatively, of plastic.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

A sealing device is provided that acts as a mechanical seal or barrier to water, debris, and air flow into and out of a "fishmouth aperture" of a door, while allowing a striker pin to freely move in and out of the fishmouth aperture. The "fishmouth aperture" is an opening in the door that generally provides access to a latch mechanism for the striker pin. Three embodiments are described below. A first embodiment describes a sealing device attached to a striker pin that seals the fishmouth aperture when the door is closed. The second and third embodiments describe a sealing device attached to the perimeter of the fishmouth aperture that at least partially seals the fishmouth aperture, regardless of whether the door is closed or open.

First Embodiment

Figure 1A:
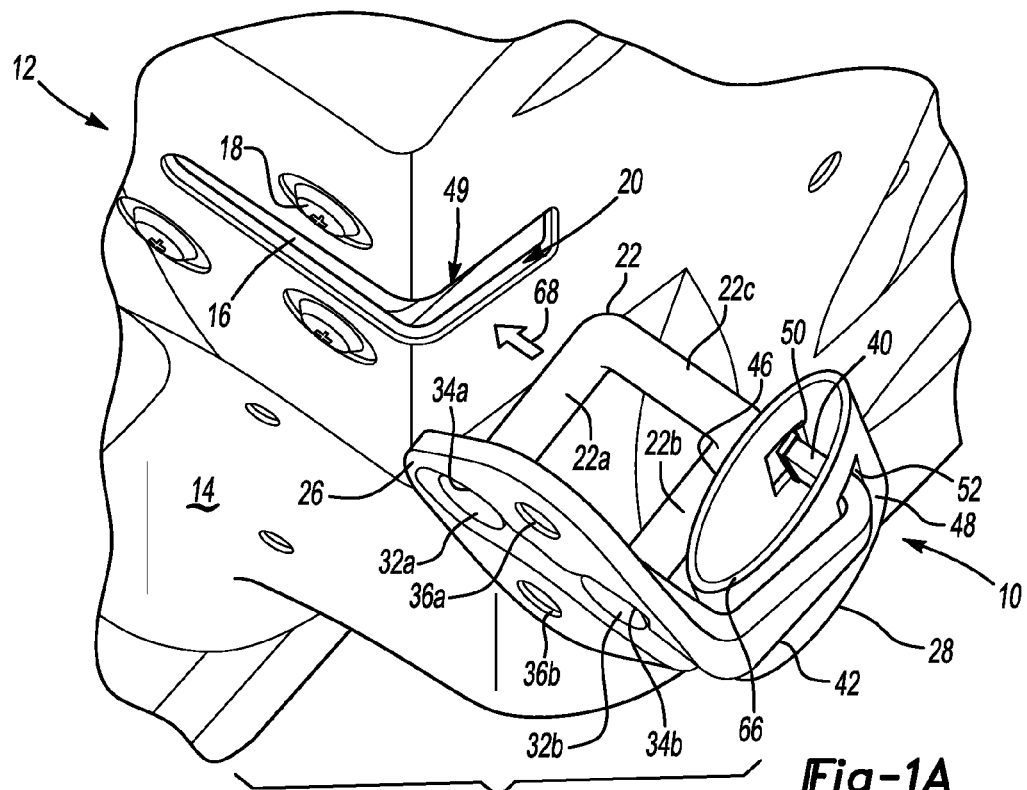
FIG. 1A is a schematic fragmentary perspective view of a sealing device in a vehicle having a door, in accordance with a first embodiment of the invention, shown when the door is in an open position.

The first embodiment is shown in FIGS. 1A and B. FIGS. 1A and B are schematic fragmentary perspective views of a sealing device 10 in a vehicle 12. The vehicle 12 includes a door 14. The door 14 has a latch 16 (partially visible) mounted within the door 14 using mounting screws 18.

The door 14 defines a "fishmouth aperture" 20 for receiving a striker pin 22. As noted above, the "fishmouth aperture" 20 is an opening in the door 14, which generally provides access to the latch 16. A striker pin 22 engageable with the latch 16, is operatively connected to a frame 24 (shown in FIG. 3) of the vehicle 12, such as the B-pillar. Any type of known latch mechanism may be used for the latch 16. For example, the latch 16 may include a fork bolt (not shown) with a throat (not shown) that captures the striker pin 22 when the fork bolt is in the latched position. The throat of the fork bolt is open when the fork bolt is in the unlatched position.

Figure 1B:
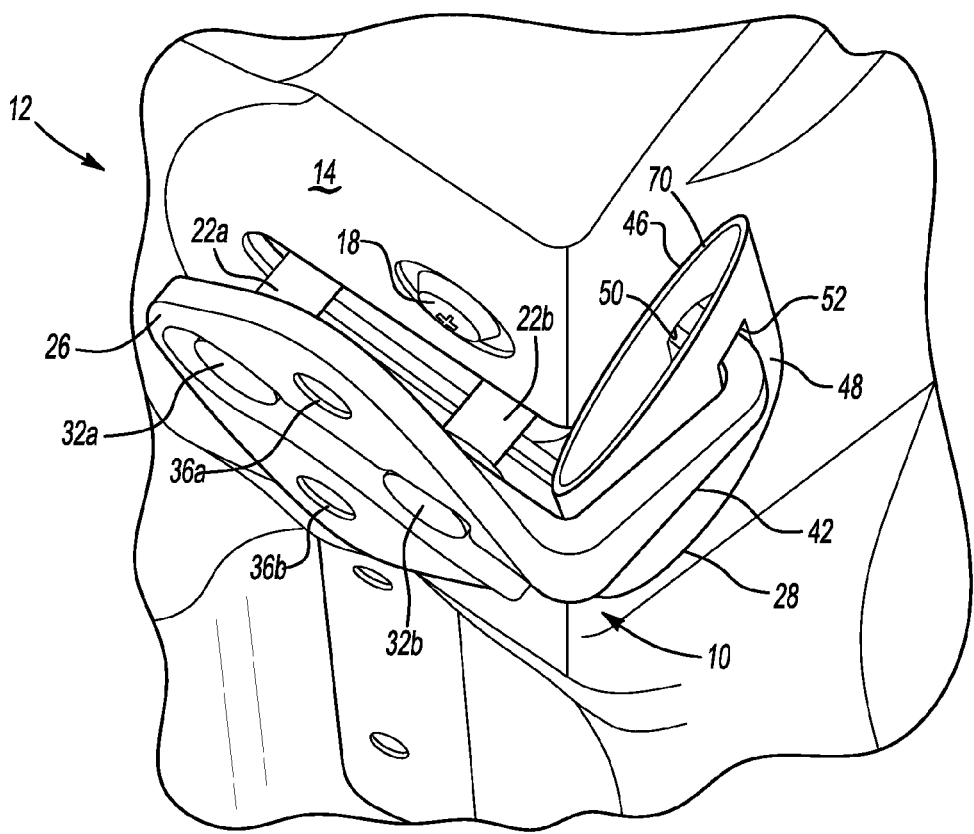
FIG. 1B is a schematic fragmentary perspective view of the sealing device shown in FIG. 1A in accordance with a first embodiment of the invention, shown when the door is in a closed position.

FIG. 1A shows the relative positions of the striker pin 22 and fishmouth aperture 20 when the door 14 is in an open position. FIG. 1B shows the relative positions of the striker pin 22 and fishmouth aperture 20 when the door 14 is closed. The striker pin 22 enters the fishmouth aperture 20 and "strikes" or engages with the latch 16 as the door 14 is closed. The striker pin 22 exits the fishmouth aperture 20 and disengages with the latch 16 when the door 14 is opened. The striker pin 22 includes first, second and third portions 22A, 22B and 22C.

Figure 2:
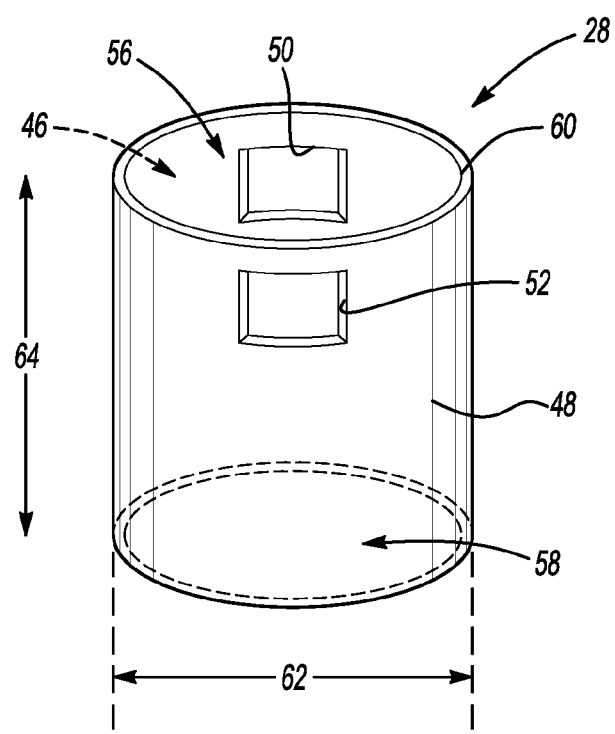
FIG. 2 is a schematic perspective view of a compressible sleeve in accordance with a first embodiment of the invention.
Figure 3:
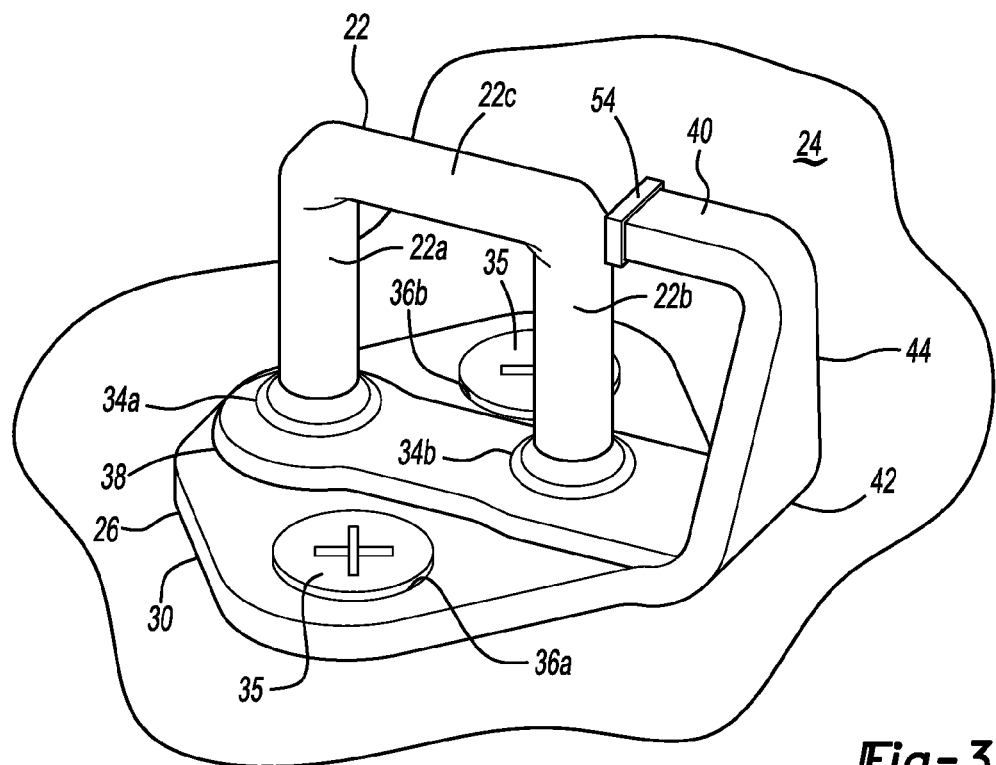
FIG. 3 is a schematic perspective view of an integrated bracket in accordance with a first embodiment of the invention.

The sealing device 10 includes an integrated bracket 26 (shown in FIG. 3) attached to the striker pin 22 and a compressible sleeve 28 (shown in FIG. 2) engageable with or fitted onto the integrated bracket 26, as shown in FIG. 1B. As shown in FIG. 3, the integrated bracket 26 includes a base 30 having a plurality of holes punched through. The first and second portions 22A, 22B of the striker pin 22 have first and second ends 32A, 32B (shown in FIGS. 1A, 1B) which are mounted on holes 34A, 34B, respectively, on the base 30 of the integrated bracket 26.

The integrated bracket 26 is mounted to a door frame or pillar 24 of the vehicle 12 via bolts 35 inserted in mounting holes 36A, 36B on the base 30, as shown in FIG. 3. The integrated bracket 26 is shown with a raised section 38 in FIG. 3, however this feature is optional. The integrated bracket 26 includes a generally straight protruding first section 40 and a generally straight second section 42. The second section 42 has a tapered width 44, narrowing towards the first section 40. The base 30 is contiguous with the second section 42, which is contiguous with the first section 40.

As shown in FIGS. 1A-B, a compressible sleeve 28 is attached to or fitted onto the integrated bracket 26. The sleeve 28 includes a sealing side 46 and an outer side 48. The sealing side 46 of the sleeve 28 contacts the perimeter 49 of the fishmouth aperture 20 when the door 14 is closed, and creates a surface seal as shown in FIG. 1B, and discussed below.

The sleeve 28 is fitted onto the first section 40 of the integrated bracket 26 through first and second slots 50, 52 formed on the sealing side 46 and outer side 48, respectively, of the sleeve 28. The slots 50, 52 are formed such that the first section 40 passes approximately through the center of the respective slots. The extremity 54 of the integrated bracket 26 may be made with a cross-section that is slightly larger than the size of the slots 50, 52, such that the sleeve 28 can be stretched and fitted onto the integrated bracket 26 (at the first section 40) while preventing the sleeve 28 from slipping off the integrated bracket 26 (at the first section 40). Any other means of preventing the sleeve 28 from slipping off may be used, for example, by using mechanical fasteners or applying adhesive.

The sleeve 28 is hollow, with a first and second opening 56, 58. FIG. 2 is a schematic perspective view of the sleeve 28 in the absence of any compression or force applied to it, which is referred to hereinafter as the "uncompressed shape" of the sleeve 28. The sleeve 28 has an uncompressed shape that is generally cylindrical, with the first and second openings 56, 58 having a generally circular shape 60 (circular when viewed from above in FIG. 2). In the embodiment shown, the outer diameter 62 of the first and second openings 56, 58 is approximately 30 mm. The length 64 of the sleeve 28 is approximately 30 mm in the embodiment shown. Note that the length, width and shape of the sleeve 28 may be varied within the scope of the invention.

Although compressible, the sleeve 28 is configured to be sufficiently rigid to provide an adequate seal on the door 14. When force is applied to the sleeve 28, the sleeve 28 is compressed. When the sleeve 28 is fitted onto the integrated bracket 26, the first and second openings 56, 58 may be initially compressed from the generally circular shape 60 to a generally oval shape 66, shown in FIG. 1A. The sleeve 28 is formed from a sufficiently resilient material that allows the sleeve 28 to return to its uncompressed or initially compressed shape once the applied force is removed. In the embodiment shown, the sleeve 28 is made of rubber. Other suitable materials may also be used.

Operation

FIG. 1B shows the relative positions of the striker pin 22 and fishmouth aperture 20 when the door 14 is closed. As the door 14 closes, the first portion 22A of the striker pin 22 enters the fishmouth aperture 20 and strikes the latch 16. Next, the second portion 22B of the striker pin 22 enters the fishmouth aperture 20. The movement of the striker pin 22 is in a generally horizontal direction, as shown at 68. As the striker pin 22 enters the fishmouth aperture 20, the sleeve 28 is further compressed, with the outer side 48 moving closer to the sealing side 46. The first and second openings 56, 58 are now pressed further to a generally flattened shape 70. As the door 14 is closed, the sealing side 46 of the sleeve 28 contacts the perimeter 49 of the fishmouth aperture 20, and creates a surface seal at the perimeter 49. As the door 14 is opened and moved away from the frame 24 (shown in FIG. 3), the surface seal is broken, allowing the striker pin 22 and integrated bracket 26 to withdraw to the relative positions shown in FIG. 1A. The sleeve 28 is made of a sufficiently resilient material that will return to its initially compressed shape (generally oval shape 66) once the door 14 is opened.

Second Embodiment

Figure 4:
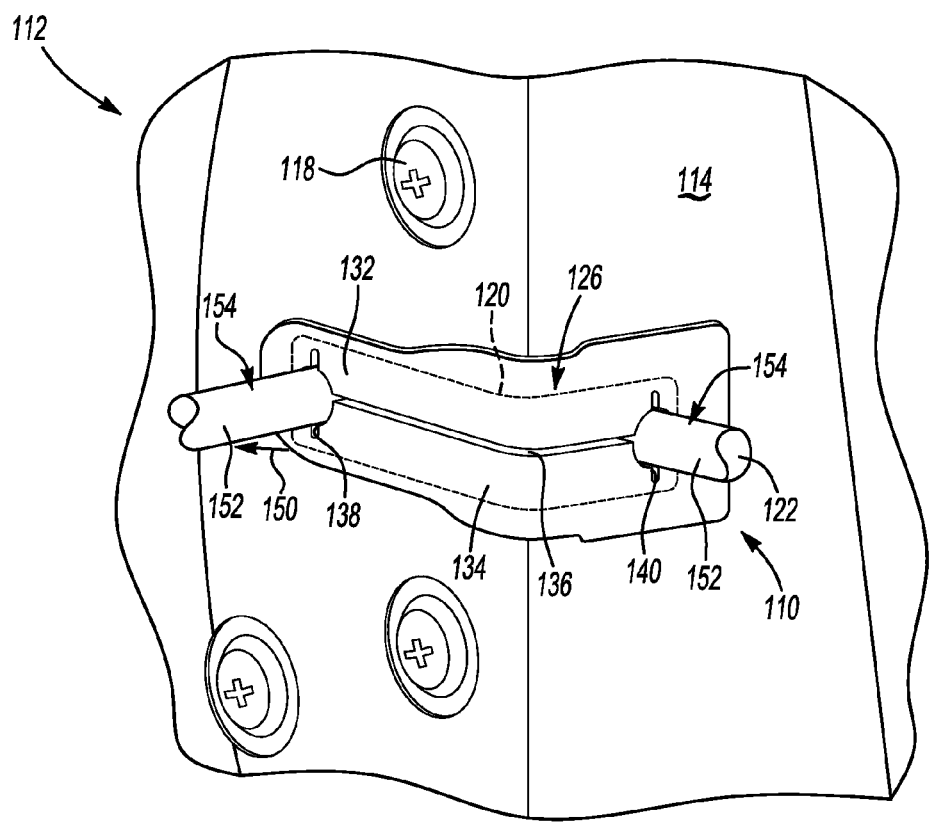
FIG. 4 is a schematic fragmentary perspective view of a sealing device in a vehicle having a door, in accordance with a second embodiment of the invention, shown when the door is in a closed position.

The second embodiment is shown in FIG. 4. FIG. 4 is a schematic fragmentary perspective view of a sealing device 110 in a vehicle 112 having a door 114, shown when the door 114 is closed. The door 114 has a latch (not shown) mounted within the door 114 using mounting screws 118. Any type of latching mechanism may be used for the latch.

The door 114 defines a "fishmouth aperture" 120 for receiving a striker pin 122. The "fishmouth aperture" 120 is an opening in the door 114 providing access to a latch (not shown) for the striker pin 122. The striker pin 122 (partially shown in FIG. 4) is operatively connected to a frame (not shown) of the vehicle 112, such as the B-pillar.

The sealing device 110 is attached to the surface of the door 114 at the perimeter 126 or edge of the fishmouth aperture 120 using adhesive, mechanical fasteners or any other suitable means. The sealing device 110 remains affixed to the door 114 around the fishmouth aperture 120 as shown in FIG. 4, regardless of whether the door 114 is open or closed.

The sealing device 110 includes first and second portions 132, 134, shown in FIG. 4. In the embodiment shown, the sealing device 110 is made of rubber. Any other suitable material may also be used. The sealing device 110 includes one or more slits oriented in various directions. As shown in FIG. 4, a first slit 136 separates the first and second portions 132 and 134. A second and third slit 138, 140 are also shown, oriented approximately perpendicularly to the first slit 136. The shape and orientation of the plurality of slits may be changed to conform to the corresponding design of the striker pin 122. For example, the slits may be generally circular, rectangular, oval or any other shape.

Operation

FIG. 4 shows the relative positions of the striker pin 122 and fishmouth aperture 120 when the door 114 is closed. As the door 114 closes, the striker pin 122 enters the fishmouth aperture 120 and "strikes" or engages with the latch (not shown) in the door. The movement of the striker pin 122 is in a generally horizontal direction, as shown at 150. FIG. 4 shows that a segment 152 of the striker pin 122 protrudes from the sealing device 110. The sealing device 110 is made of a sufficiently resilient or flexible material such that the striker pin 122 can freely pass through the slits 136, 138, 140 formed in the sealing device 110, while sealing around the outer surface 154 of the striker pin 122. When the door 114 is opened, the striker pin 122 exits the fishmouth aperture 120 and disengages with the latch (not shown).

Third Embodiment

Figure 5:
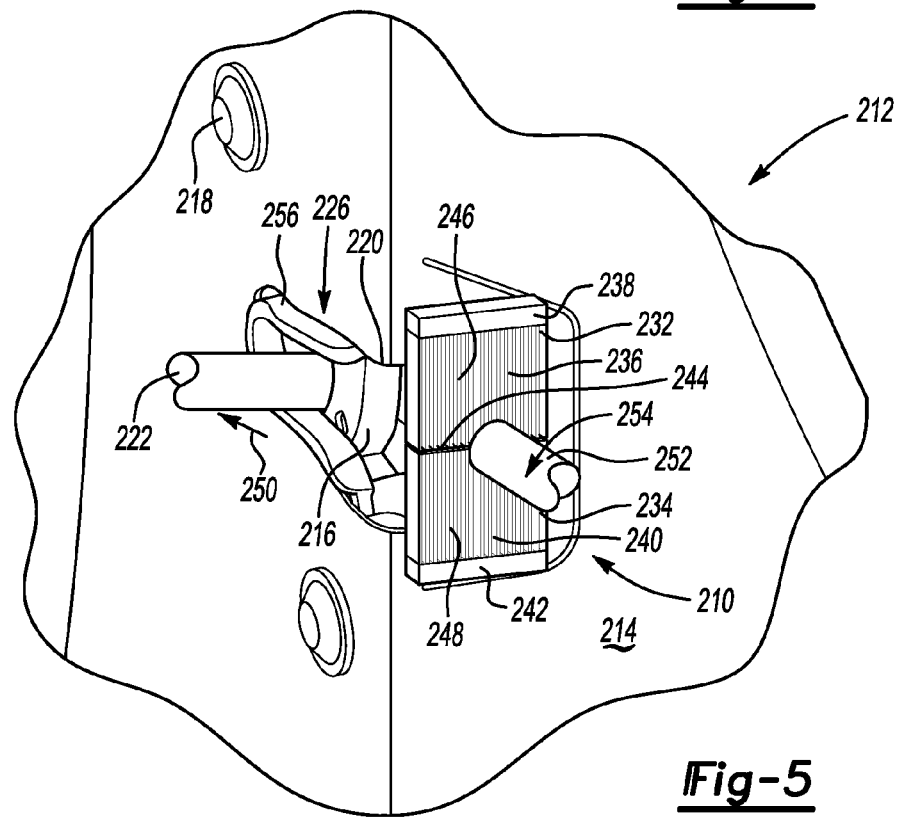
FIG. 5 is a schematic fragmentary perspective view of a sealing device in a vehicle having a door, in accordance with a third embodiment of the invention, shown when the door is in a closed position.

The third embodiment is shown in FIG. 5. FIG. 5 is a schematic fragmentary perspective view of a sealing device 210 in a vehicle 212 having a door 214, shown when the door 214 is closed. The door 214 has a latch 216 mounted within the door 214 using mounting screws 218. Any type of latching mechanism may be used for the latch 216.

The door 214 defines a "fishmouth aperture" 220 for receiving a striker pin 222. The "fishmouth aperture" 220 is an opening in the door 214 providing access to the latch 216 for the striker pin 222. The striker pin 222 (partially shown in FIG. 5) is operatively connected to a frame (not shown) of the vehicle 212, such as the B-pillar.

The sealing device 210 is attached to the surface of the door 214 around the perimeter 226 or edge of the fishmouth aperture 220 using adhesive, mechanical fasteners or any other suitable means. The sealing device 210 remains affixed to the door 214 around the fishmouth aperture 220 as shown in FIG. 5, regardless of whether the door 214 is open or closed.

The sealing device 210 includes first and second portions 232, 234, shown in FIG. 5. Each respective portion 232, 234 includes a row or set of bristles attached to a holder, made of plastic or any suitable material. The first portion 232 includes a first set of bristles 236 attached to a first holder 238. The second portion 234 includes a second set of bristles 240 attached to a second holder 242. The first and second set of bristles 236, 240 may be composed of fiber, plastic or any other suitable materials. The first and second set of bristles 236, 240 may be attached by any suitable means to the first and second holders 238, 242, respectively, such as adhesives or mechanical fasteners.

The sealing device 210 includes one or more slits oriented in various directions. As shown in FIG. 5, a first slit 244 separates the first and second portions 232 and 234. A second and third slit 246, 248 are also shown, oriented approximately perpendicularly to the first slit 244. The second and third slits 246, 248 are within the first and second set of bristles 236, 240, respectively. The shape and orientation of the plurality of slits may be changed to conform to the corresponding design of the striker pin 222.

Operation

FIG. 5 shows the relative positions of the striker pin 222 and fishmouth aperture 220 when the door 214 is closed. As the door 214 closes, the striker pin 222 enters the fishmouth aperture 220 and "strikes" or engages with the latch 216 in the door 214. The movement of the striker pin 222 is in a generally horizontal direction, as shown at 250. FIG. 5 shows that a segment 252 of the striker pin 222 protrudes from the sealing device 210. The first and second set of bristles 236, 240 of the sealing device 210 are made of a sufficiently resilient or flexible material such that the striker pin 222 can freely pass through the slits 244, 246, 248 formed in the sealing device 210, while sealing around the outer surface 254 of the striker pin 222. The striker pin 222 exits the fishmouth aperture 220 and disengages with the latch 216 when the door 214 is opened.

While FIG. 5 shows the first and second portions 232, 234 covering one side of the fishmouth aperture 220, the remaining open portion 256 of the fishmouth aperture 220 may also be covered using opposing sets of bristles attached to holders, as described above.

In conclusion, the embodiments described above may prevent debris or water flowing down the vehicle door from entering the latch and inner cavity of the door. It may also provide a barrier to debris or water that enters the inner cavity of the door via the window sill (not shown) from seeping out through the fishmouth aperture and filling up the door sill (not shown) between the inner and outer seals (not shown) of the door. The embodiments described above may be adapted to any latch system where a barrier or obstruction is desired.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
 a door movable between a closed and an opened position, said door defining a fishmouth aperture configured to receive a striker pin;
 a striker pin configured to enter said fishmouth aperture when said door closes and exit said fishmouth aperture when said door opens; and
 a sealing device configured to at least partially seal said fishmouth aperture while allowing said striker pin to enter and exit said fishmouth aperture;
 the sealing device including an integrated bracket operatively connected to said striker pin;
 a compressible sleeve engaged with said integrated bracket, the sleeve being configured to compress when force is applied; and
 wherein said sleeve has a sealing side that seals to a surface of the door around a perimeter of said fishmouth aperture when said door is closed.

2. The vehicle of claim 1, wherein
 said striker pin is operatively connected to a frame of said vehicle; and
 said door includes a latch that engages with said striker pin when said door closes, said latch disengaging with said striker pin when said door opens.

3. The vehicle of claim 1, wherein said sleeve has a generally cylindrical hollow shape with a generally circular first and second opening in the absence of said applied force.

4. The vehicle of claim 1, wherein said sleeve is formed from a sufficiently resilient material that allows said sleeve to return to said generally cylindrical hollow shape when said applied force is removed.

5. The vehicle of claim 1, wherein said sleeve is made of rubber.

6. The vehicle of claim 1, wherein:
 said integrated bracket includes a base and a protruding first section operatively connected to the base;
 said sleeve has an outer side; and said sleeve is fitted onto said first section of said integrated bracket through respective slots formed on said sealing and said outer sides of said sleeve.

7. The vehicle of claim 6, wherein said first section of said integrated bracket has an extremity slightly larger than said respective slots on said sleeve to prevent said sleeve from slipping off said integrated bracket.

8. The vehicle of claim 6, wherein a first and a second end of said striker pin are operatively connected to said base at respective first and second holes in said base.

9. A vehicle comprising:
a door movable between a closed and an opened position, said door defining a fishmouth aperture configured to receive a striker pin;
a striker pin configured to enter said fishmouth aperture when said door closes and exit said fishmouth aperture when said door opens;
a sealing device configured to at least partially seal said fishmouth aperture while allowing said striker pin to enter and exit said fishmouth aperture;
wherein the sealing device includes a first portion and a second portion attached to the door at a perimeter of said fishmouth aperture, the first portion and the second portion being configured to at least partially seal said fishmouth aperture when said door is open and when said door is closed;
a first slit between said first portion and said second portion of said sealing device;
a second slit oriented approximately perpendicularly to said first slit, and
wherein said first slit and second slit are configured to allow said striker pin to enter said fishmouth aperture such that said sealing device seals around outer surfaces of said striker pin.

10. The vehicle of claim 9, wherein said sealing device is made of rubber.

11. A vehicle comprising:
a door movable between a closed and an opened position, said door defining a fishmouth aperture configured to receive a striker pin;
a striker pin configured to enter said fishmouth aperture when said door closes and exit said fishmouth aperture when said door opens; and
a sealing device configured to at least partially seal said fishmouth aperture while allowing said striker pin to enter and exit said fishmouth aperture;
wherein the sealing device includes a first portion and a second portion attached to the door at a perimeter of said fishmouth aperture, the first portion and the second portion being configured to at least partially seal said fishmouth aperture when said door is open and when said door is closed;
wherein said first portion of said sealing device includes a first set of bristles attached to a first bristle holder; and
wherein said second portion of said sealing device includes a second set of bristles attached to a second bristle holder.

12. The vehicle of claim 11, wherein said first and second set of bristles are composed of fiber.

13. The vehicle of claim 11, wherein said first and second set of bristles are composed of plastic.

* * * * *